United States Patent [19]

Kneer

[11] 4,191,643
[45] Mar. 4, 1980

[54] METHOD FOR THE MECHANICAL PREPARATION OF ORGANIC WASTES IN A BIOLOGICAL DIGESTION PROCESS

[75] Inventor: Franz X. Kneer, Eschenburg-Eibelshausen, Fed. Rep. of Germany

[73] Assignee: Gebruder Weiss K.G., Dillenburg, Fed. Rep. of Germany

[21] Appl. No.: 878,801

[22] Filed: Feb. 17, 1978

[30] Foreign Application Priority Data

Feb. 25, 1977 [DE] Fed. Rep. of Germany ....... 2708313

[51] Int. Cl.² .............................................. C02C 3/00
[52] U.S. Cl. .......................................... 210/4; 210/10; 210/18
[58] Field of Search ................................ 210/10, 3–8, 210/18, 63 R, 67

[56] References Cited

U.S. PATENT DOCUMENTS 2,977,214   3/1961   McLellan .............................. 210/10

FOREIGN PATENT DOCUMENTS 711565   6/1965   Canada ..................................... 210/10
2250610  4/1974   Fed. Rep. of Germany ............. 210/10

Primary Examiner—Thomas G. Wyse
Attorney, Agent, or Firm—Toren, McGeady and Stanger

[57] ABSTRACT

In the preparation of organic wastes for introduction into a biological digestion reactor, initially the wastes are mixed with at least a carbon-containing material and the mixed materials are controllably supplied into a mixing press. In the mixing press, the materials are gradually mixed and compressed as they pass from the press inlet to its outlet. At the outlet, the materials, from which most of the water has been removed, are formed into elongated pieces of 10 to 20 mm in diameter with a maximum length of approximately 150 mm. Next, the pieces are charged into the digestion reactor. The surfaces of the pieces extending in the elongated direction are smooth while their transverse end surfaces are broken, permitting air to pass through the pieces in their elongated direction as they move downwardly through the reactor.

5 Claims, 2 Drawing Figures

METHOD FOR THE MECHANICAL PREPARATION OF ORGANIC WASTES IN A BIOLOGICAL DIGESTION PROCESS

SUMMARY OF THE INVENTION

The invention is directed to a method of the preparation of organic wastes, such as sewage sludge, animal defecated matter and the like, mixed with a carbon-containing material, such as sawdust, for introduction into a biological digestion reactor.

In the environmentally suitable treatment of organic waste materials, particularly sewage sludge, it has been known to convert such waste material into compost by a biological conversion employing the effect of oxygen for use as the compost in a natural cycle. As a rule, such waste material is transported by water and, as a result, the materials contain a high proportion of water, for example, in sewage sludge water is present in the range of 10 to 100 times that of the transported solid materials. Additionally, before such wastes can be introduced into a biological digestion process, they must be mixed with a carbon-containing material to provide the C:N ratio required for digestion. Preferably, sawdust is used as the carbon-containing material. Accordingly, sewage sludge must have its water content removed before it is introduced into an aeration reactor for carrying out the digestion process and the carbon-containing material must be mixed with the waste material before it enters the digester. Previously, forced mixing apparatus has been used for combining the waste and carbon-containing materials.

One example of a forced mixing member is a double shaft mixer in which a good mixing effect is obtained, however, the waste material, such as sewage sludge from towns and cities or defecated matter collected from large animal farms and mixed with sawdust, becomes plastified during mixing because of the colloidal nature of the organic waste and is rendered impermeable to air. During aeration, lumps tend to form which pose significant difficulties in the digestion process. Even at high pressures, it is impossible to aerate completely the entire cross section of a loose pile of material passing through an aeration reactor. Usually, the air follows the path of least resistance between the individual lumps. As a result, bypass air channels are formed through the pile of material which prevent a uniform digestion process so that the waste material is unevenly digested across its cross section as it moves in the form of a tall column through the reactor.

To eliminate this disadvantage, in the past the quantity of carbon-containing material has been increased with the result that the amount of sewage sludge being treated was not economically acceptable.

In DT-PS 1,145,646 a method is disclosed in which a mixture of partially dehydrated sewage sludge, in particular, sludge having a water content of below 70%, and comminuted garbage, especially finely chopped garbage material, is subjected to a compressing action reducing it to approximately $\frac{1}{3}$ of its volume without discharging any water. The pressed material is then dried by storing it in the open air. This drying process is based on brisk self-heating during storage, that is, a biological digestion takes place within the material, but without the growth of fungi which only develops at low temperatures on digestive material. To make such stored material hygienically satisfactory, a mixture of sewage sludge and garbage is used having a temperature, due to microbic digestion, of approximately 60° Celsius or above, preferably 65° Celsius, or a mixture in which the garbage component has reached that temperature. As a result, the added sewage sludge merely serves as a nitrogen source.

The object of this known procedure is to create an odor-free and biologically active material for soil fertilization which material is not affected by storage so that the initiation of the biological digestion by means of microbes, that is, a composting action, does not take place until the bacteria, with the addition of water, is introduced into the material as it is spread over large land areas, in hotbed boxes or as compost for gardens.

Accordingly, in this known process the pretreatment of the waste materials serves to stabilize them so that they can be stored and transported and the process requires a hot mixing prior to the compression of the material to provide the disposal of pathogenic germs. The compression of the material is carried out so that no water is discharged with the drying of the compressed material being effected by a self-heating action.

It is the primary object of the present invention to provide a method for the mechanical preparation of organic wastes, especially sewage sludge, mixed with carbon-containing materials so that the mixture can be introduced into a biological digestion process in which the mixed materials contain a minimum of the carbon-containing material so that improved aeration can be achieved for optimum biological digestion of the waste material.

In accordance with the present invention, the mixed materials are compressed until their combined volume is reduced by approximately $\frac{1}{3}$ and the materials are dried. As the mixed materials complete the mixing and pressing action, a second compressing step is carried out so that the materials are almost completely de-aerated and are then converted into compressed pieces or parts with fractured end surfaces. These pieces are formed with a diameter of approximately 10 to 20 mm while their lengths vary with a maximum length of approximately 150 mm. After the mixing and pressing operation, the pieces of mixed materials are introduced into a reactor into which air is forced for initiating the spontaneous digestion process.

In a preferred embodiment of the invention, the mixing and pressing operation is carried out in a mixing press into which the combined materials are charged. At its outlet end, the mixing press is provided with a molding member which forms the elongated pressed pieces from the mixed materials which have been partially dehydrated in the press. The pressure of the molding member acts essentially in a direction perpendicular to the direction of the compressed pieces discharged from the mixing press. A screw member extends through the mixing press from its inlet to its outlet affording a zone in which the mixing takes place and a gradual compressing action is imparted. The molding member is a perforated sheet-metal plate located at the outlet end of the screw. The perforated plate extends perpendicularly of the screw axis and has holes with diameters of 10 to 20 mm on the outlet side of the plate. Each hole has a first cylindrical section extending from the outlet side of the plate toward the interior of the press and a second frusto-conically shaped section extending from the first section to the inlet side of the plate. The frusto-conical sections of the holes diverge inwardly toward the interior of the press. A stripping member is mounted on the screw alongside the inner or inlet side of the plate.

In the present invention, the mixed materials are charged into the press in an economically advantageous ratio and, in a single operation within the press, are mixed, dehydrated and converted into a form which facilitates a most advantageous aeration of the material within a digestion reactor. Further, the materials are discharged from the press in a form which permits simplicity in handling. Moreover, the amount of carbon-containing materials is kept to a minimum.

This mixing and compressing operation leads to significant advantages. The pressed pieces of the combined materials can be introduced into the aeration reactor in a very simple manner and can be distributed in a uniform loose pile which is permeable to air without having the material stick to the transporting and distribution means or without the pieces sticking together. This characteristic of the compressed pieces is caused by the smooth surfaces of the pieces as a result of their passage through the perforated plate in which the pressure applied to the material acts essentially in a direction perpendicular to the longitudinal axis of the pieces. As the pieces emerge from the perforated plate, they break off as a result of their own weight. Accordingly, porous end surfaces are provided at the fracture planes and such surfaces are particularly desirable in affording a capillary effect. Moreover, as the materials pass through the perforated plate, the compressing action results in an almost complete de-aeration of the materials and the formation of capillary pores and ducts through the interior of the pieces. These pores and ducts extend primarily in the elongated direction of the pieces terminating at the end or fracture surfaces. Due to the capillary effect, water is forced out of the compressed pieces at the fracture surfaces and, during subsequent aeration, air is sucked into the pores for effecting a spontaneous commencement of the digestion process. During digestion, each of the individual pieces is expanded and then crumbles to an increasing extent as the pieces move downwardly through the reactor, particularly if a counter flow of air is provided. Any capillary openings in the elongated surfaces of the pieces are closed due to the compressing action afforded by the perforated plate. Water emerging from the surface of the individual pieces can flow out of the mixing press or evaporate during the digestion operation due to the heat generated within the reactor. As a result, the digestion process in a forced air reactor is significantly accelerated not only because of the improved aeration of the material but also because the air is sucked by the capillary pores into the interior of the pieces. Therefore, a quick initiation of digestion at high temperatures takes place. Another advantage occurs from the fact that the loose pile of compressed pieces containing the prepared waste material can be aerated more effectively than in the past, because the pieces have a low resistance to flow. In accordance with the present invention, a lower energy output is required than has previously been the case for operating aeration reactors and larger reactors can be used than in the past which has a positive economical effect.

Another characteristic of the invention is that the digestion process is significantly improved by mixing the organic wastes and other materials in a ratio of 10 to 15% by volume of the carbon-containing material, 20 to 30% by volume of recycled biologically digested material, and 55 to 70% by volume of municipal sewage sludge.

In accordance with the present invention, a material is provided which is capable of being digested and not merely being stored. Furthermore, the mixed materials are combined in a ratio which affords an economically desirable forced aeration process. Still another advantage of the invention is that, for the first time, pure oxygen can be introduced into the digestion process in exact amounts, since oxygen bypass channels do not develop in the loose pile of mixed materials.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figures 1, 2:
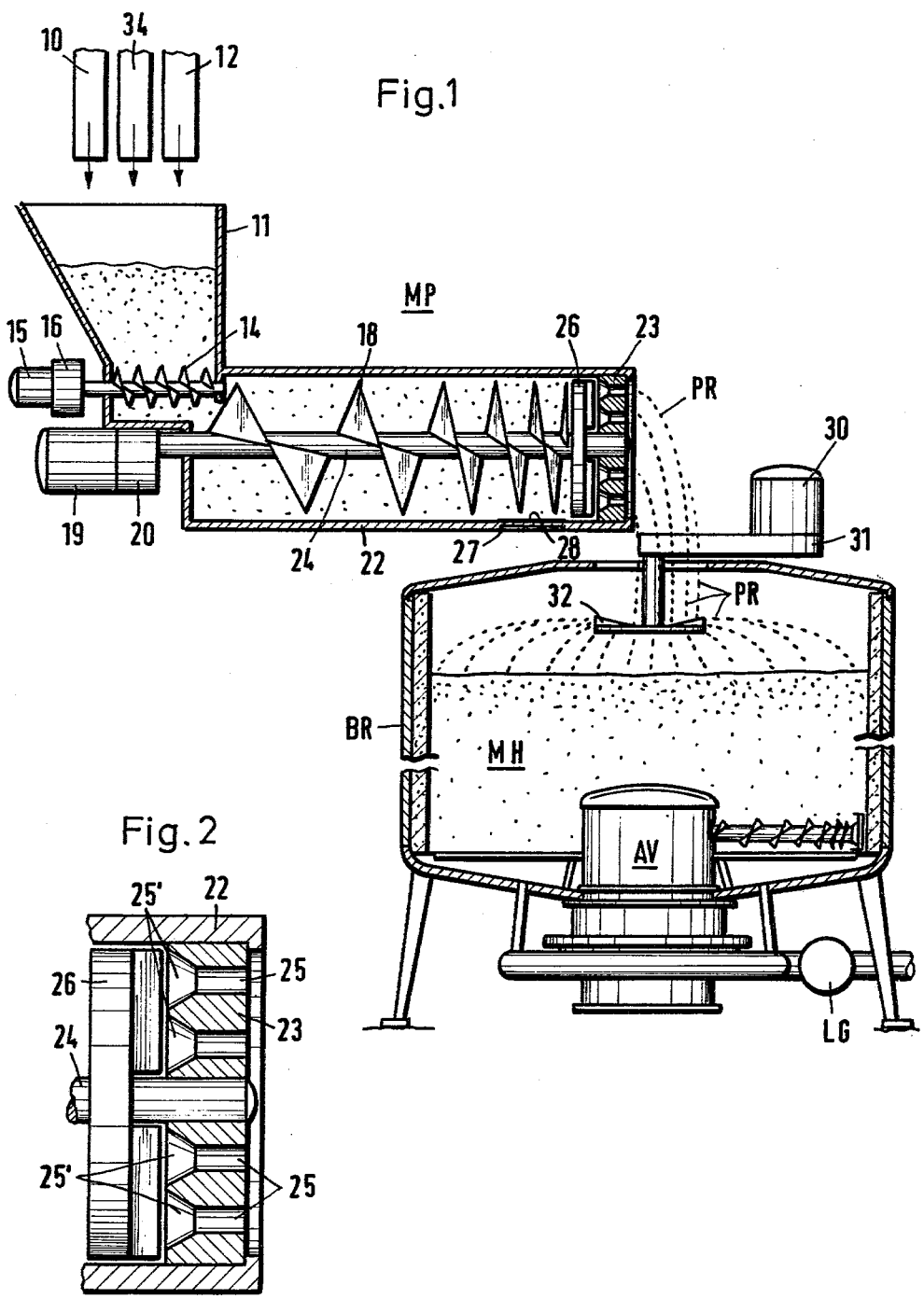
FIG. 1 is a schematic cross sectional view of an apparatus embodying the present invention.
FIG. 2 is an enlarged detail view of a portion of the apparatus shown in FIG. 1.

In FIG. 1, an apparatus is illustrated for mechanically dehydrating organic waste before it is charged into an aeration reactor BR for biological digestion. The organic waste may be either municipal sewage sludge or animal defecated matter from an animal farm, referred to as compost or raw material, and is fed from a screen belt or travelling screen press, not shown in the drawing, into a feeding hopper 11 of a mixing press MP through a delivery member 10. Carbon-containing material, such as sawdust, is also introduced into the hopper 11 through another delivery member 12. These materials are charged into the hopper in such a manner that the mixed material consists of approximately 85 to 90% by volume of organic wastes and 10 to 15% by volume of carbon-containing materials.

At the lower or outlet side of the hopper 11, from which the material is directed into the press MP, a feeding screw 14 is provided for controllably charging the material into the mixing press.

Feeding screw 14 is driven by a motor 15 via a variable speed gearing 16 for controllably introducing the materials into the mixing press. Positioned in the mixing press is a mixing and pressing screw 18 extending horizontally from the press inlet to its outlet. As can be seen in FIG. 1, the screw 18 has a variable pitch over its length with the pitch decreasing from the inlet to the outlet ends of the press. A motor 19 drives the mixing and pressing screw 18 at a constant rate by means of a gearing 20.

The mixing press MP includes a housing 22 closely enclosing the mixing and pressing screw 18. The outlet end of the housing is closed by a perforated disk or plate 23 which serves as a bearing for the shaft 24 of the screw 18, note FIG. 2. A plurality of holes extend through the plate 23 parallel to the axis of the shaft. At its outlet side, that is, the side facing outwardly from the interior of the housing 22, the holes 25 are formed by cylindrically shaped sections which have a diameter of approximately 10 to 20 mm. On the inner side of the plate 23, that is, the side facing into the housing 22, the holes are formed by frusto-conically shaped sections 25' and the surfaces of the frusto-conical sections of the holes converge inwardly to the cylindrically shaped sections 25. As the materials pass through the perforated plate 23, they first move through the frusto-conical sections 25' of the holes so that the materials are compressed and then move out of the press through the constant diameter sections 25 of the holes. The effect of these holes on the mixed materials conveyed through the press will be described in detail later.

Immediately adjacent the inside face of the perforated plate 23 is a stripping or scraping member 26 mounted on the shaft 24 of the screw 18. As the screw rotates, the scraping member 26 prevents fibrous carbon-containing materials from collecting at the inside face of the plate 23 and prevents clogging of the holes.

Located in the bottom of the housing 22 and adjacent the perforated plate 23 is an opening 27 covered by a screen 28. Water pressed out of the materials as they are conveyed through the mixing press can be discharged through this opening.

The outlet end of the mixing press MP is located above an opening in the top of the digestion vessel or reactor BR and a centrifugal plate 32 is located immediately below the opening in the reactor. The centrifugal plate 32 is driven by a motor 30 over a gearing 31. As shown diagrammatically in FIG. 1, the mixed materials leave the mixing press MP in the form of compressed pieces or sections and fall through the opening in the reactor onto the centrifugal plate 32 which distributes the pieces uniformly to create a level upper surface in the reactor.

The mixed materials fed into the reactor through the opening in its top travel downwardly in the form of a loose pile MH of individual compressed pieces of the mixed material. Located below the reactor is a blower LG which supplies a forced flow of air into the entire cross section of the pile. The air passes upwardly through the pile in counter flow with the pieces of mixed material. The material, after being biologically digested in its downward passage through the reactor, is discharged by a device AV at the bottom of the reactor.

In the apparatus described above, the combined organic waste and carbon-containing material fed into the feeding hopper 11 is delivered into the press MP by the delivery screw 14.

The rotational speed of the screw 14 is controlled by a variable speed gearing 16 for adjusting the amounts of the combined materials introduced into the press. The mixing and pressing procedure performed within the housing 22 is carried out in a known manner until the volume of the materials is reduced to approximately ⅓ and at the same time the materials are dehydrated. Water separated from the materials is discharged through the opening 27. Subsequently, the mixed material which has been reduced to approximately ⅓ of its volume, is pressed first through the frusto-conical sections 25' of the holes in the perforated plate 23 and finally through the constant diameter sections 25 of the holes. The converging sections 25' of the holes produce a compressive force acting essentially perpendicularly to the direction of flow of the materials through the holes. As the mixed materials flow through the holes, they are compressed into individual pressed pieces PR, each approximately 10 to 20 mm in diameter and the pieces are almost completely de-aerated. As the materials move through the constant diameter or cylindrical sections 25 of the holes, the outer or cylindrical surfaces of the pieces are made smooth. As the pieces PR are forced outwardly from the perforated plate 23, they break off at various lengths with the maximum length being approximately 150 mm, and they fall, as shown in FIG. 1, through the opening in the top of the reactor BR onto the centrifugal plate 32 which distributes the pieces into a uniform loose pile within the reactor. As the individual pieces break off while they move outwardly from the perforated plate 23, their transverse end surfaces present a fractured surface containing openings which provide access to the capillaries produced within the pressed pieces. During the forced aeration of the reactor, these capillaries in the pieces provide an intensive sucking action drawing the air through the interior of the pieces. Accordingly, the desired digestion process commences spontaneously in the interior of each piece and causes it to inflate or expand. This inflation action becomes more intense as the depth of the pieces within the loose pile increases. Due to this inflation action, the individual pieces eventually crumble. As a result, a uniform aeration of the mixed material takes place and a uniform digestion provided over the entire cross section of the loose pile of pieces within the reactor is achieved.

To intensify the commencement of the digestion process, it is possible to include recycled digested material, so-called return material, taken from the discharge AV of the reactor and fed into the hopper 11 through a delivery member 34.

Where such recycled material is used, the mixed materials include organic waste of approximately 55 to 70% by volume, carbon-containing material, usually in the form of sawdust, amounting to 10 to 15% by volume and recycled digested material of about 20 to 30% by volume.

As can be appreciated, other arrangements of the mixing press MP are also possible, the important characteristic is that, in the preparation of the organic waste to be digested, the waste material along with the added materials pass through the mixing-pressing process immediately before they are introduced into a digestion reactor in which they are immediately forcibly aerated to commence the spontaneous digestion process.

While specific embodiments of the invention have been shown and described in detail to illustrate the application of the inventive principles, it will be understood that the invention may be embodied otherwise without departing from such principles.

What is claimed is:

1. Method of mechanically preparing organic waste, such as sewage sludge, animal defecated matter and the like, for introduction into a biological digestion process with the addition of carbon-containing matter, such as sawdust, into the organic waste, comprising the steps of moving the organic waste and added carbon-containing materials through a laterally closed housing and mixing the organic waste and added carbon-containing matter and at the same time compressing the combined material for effecting its dehydration and reducing its volume to approximately ⅓ of its initial volume at the completion of its passage through the housing, at the end of its movement through the housing discharging the material from the housing by pressing the material into and through at least one axially extending passageway having a first section followed by a second section having a diameter in the range of 10 to 20 mm, applying a further compressive force to the material with the force acting essentially perpendicularly to the axial direction of the passageway in the first section, smoothing the outside surface of the material within the second section and closing off any capillary opening in the outside surfaces of the material, forcing the material out of the second section so that a cylindrically shaped continuous piece of material of approximately 10 to 20 mm in diameter extends laterally unsupported from the second section with the laterally unsupported piece breaking off due to its own weight as it moves outwardly from the second section with the broken off pieces having a maximum length of approximately 150 mm and with each piece having a smooth surface extending in the length direction thereof and broken end surfaces, and feeding the pieces into an aeration reactor and forcing air into the reactor for effecting a spontaneous digestion process with the air flowing into the pieces through the broken end surfaces and flowing through the pieces in the length direction thereof.

2. Method, as set forth in claim 1, comprising combining the materials introduced to the mixing and pressing stop in a ratio of 10 to 15% by volume of the carbon-containing material and 90 to 85% by volume of the organic waste.

3. Method, as set forth in claim 2, wherein the carbon-containing material is sawdust.

4. Method, as set forth in claim 1, comprising combining the materials introduced to the mixing and pressing step in a ratio of 10 to 15% by volume of carbon-containing material, 20 to 30% by volume of previously biologically digested material and 55 to 70% by volume of organic waste.

5. Method, as set forth in claim 4, wherein the carbon-containing material is sawdust, the organic waste is sewage sludge, and the previously biologically digested material is recycled from the aeration reactor.

* * * * *